United States Patent Office 3,737,324
Patented June 5, 1973

3,737,324
ENZYME TREATMENT OF GRAPE PULP FOR WINE PRODUCTION
Vasily Ivanovich Zinchenko, ulitsa Dimitrova 16, kv. 79, Kishinev, U.S.S.R.; Ljudmila Sergeevna Salmanova, ulitsa Korolenko 1, korpus 3, kv. 19, Moscow, U.S.S.R.; and Filipp Leontievich Minchuk, ulitsa Aleshina 6/3, kv. 65, Kishinev, U.S.S.R.
Filed Mar. 24, 1970, Ser. No. 22,325
Int. Cl. C12g 1/02
U.S. Cl. 99—35
11 Claims

ABSTRACT OF THE DISCLOSURE

A method of treatment of a grape pulp in the process for production of wines, cognac and non-alcoholic beverages in which there is added into the pulp a purified cytolytic enzyme preparation of a culture of fungus *Trichothecium roseum* having an activity of 2500 units and taken in the amount of 0.0001 to 0.1 percent by weight, and the must is separated from the pulp.

---

The present invention relates to the production of wines, cognac and non-alcoholic beverages and, more particularly, this invention relates to methods of treating grape pulp used in this process.

The present invention can be used for treating fruit-or-berry pulp for producing juice and wine from this pulp.

At present the method of treating grape pulp for the production of wines, cognac and non-alcoholic beverages consists in separation of a must from the pulp by means of mechanical or physical disintegration of the berry tissue cells of a fresh or partially prealcoholized pulp or a pulp preliminarily fermented completely or partially fermented with a subsequent alcoholization to a definite content of alcohol for the given grade of wine.

The pulp treated in such a way provides a limited yield of a high-quality fraction must (free run must, must of the first and second pressings of low-pressure grape presses), which comes to 50–60 dals. per ton of grapes depending on the grade of grapes and the ecological conditions of their growth, while the total yield of the must accounts for about 75 dals. per ton of grapes. The yield of the must may be increased by increasing the pressure. However, in this case the content of suspended solids in the must, colloids, tanning and nitrous compounds is much increased. This material considerably deteriorates the quality of the wines, particularly white and dessert wines, champagne and cognac wines materials.

Furthermore, heat treatment of the pulp at a temperature of 60–65° C. is associated with an increased loss of aromatics and this adversely effects the wine bouquet. The partial alcoholization of the pulp or its fortification to a definite content of alcohol results in losses of alcohol and prolongation of the process of production of wines. Complete fermentation of the pulp in the process of production of red table wines does not always provide for making adequately colored wines from grapes having a required amount of coloring matter.

When producing white table wines and champagne wine materials by using a mechanically worked (pressed) pulp, the process includes the following basic operation: immediate extraction of the must, supplying it to settling tanks, while simultaneously sulfating the must flow, clarification of the must, decantation of the clarified must and its fermentation. Such a process provides for a yield of a high-quality fraction within 50–60 dals. per ton of grapes, the clarification of the must during the settling lasts about 24 hours while the yield of clarified must accounts for not more than 60 percent of the yield of the high-quality fraction of the must. The wines made from such a must, particularly high-grade wines, have a flat aroma and an inadequately soft taste.

During the production of red table wines with the use of the pulp treated by mechanically or physically disintegrating the cells of the berry tissue, the process is effected according to three basic diagrams:

(1) Fermentation of the pulp up to complete fermentation of the sugar and separation of the fermented must from the pulp;

(2) Heat treatment of the fresh pulp at a temperature of 60–65° C. for removing the coloring matter therefrom, cooling of the pulp, extraction of the must therefrom and fermentation of the must;

(3) Extraction of the coloring matter from the fresh pulp by means of a prefermented dry wine and further fermentation of the sugar extracted from the pulp.

On producing wines according to the first process diagram the yield of a high-quality wine fraction of the wine accounts for about 65 dals. per ton of grapes. In this case it is not always possible to produce adequately colored wines from poorly colored grapes (Portuguese, etc.) or from the grades of grapes (Cabernet-Sovinsok, merlo, malbek and so on) usually used for making high-quality wines.

On producing wines according to the second process diagram, the yield of a high-quality must fraction accounts for about 60 dals. per ton of grapes, the heat treatment of the pulp adversely affects the wine quality (the process of oxidation of the coloring matter is intensified and the berry aromatics are actively decomposed) and the process is associated with high consumption of heat.

In addition, this process is suitable only for production of ordinary wines.

On producing wines according to the third process diagram, the yield of a high-quality wine fraction accounts for about 65 dals. per ton of grapes while the extraction does not always provide for adequate removal of the coloring matter. Furthermore the wines produced in such a way have a flat aroma and taste. This process is suitable only for making ordinary wines.

When producing white and rose dessert wines from the pulp, treated by mechanically or physically disintegrating the cells of the berry tissue of a fresh or partially prealcoholized pulp, the process consists of the following operations: infusion of the must on a fresh or partially alcoholized pulp within a time period of 12 to 78 hours, separation of the must from the pulp (by pressing), settling of the must followed by decantation of the clarified must (this operation is effected depending on the grade of the wine), partial fermentation of the must and fortification thereof to a definite content of sugar and alcohol in the given wine.

According to such a process the yield of a high-quality fraction of the must accounts for about 60 dals. per ton of grapes, the partial alcoholization of the pulp results in a considerable loss of the rectified alcohol added into the pulp while the prolonged infusion of the must prolongs the process itself and increases the turnover time of the process capacities. Furthermore, this process is labor consuming while the high-grade wines produced thereby do not always feature full-bodied aroma and adequate oiliness in taste.

When producing red dessert wines with the use of the pulp treated by destructing the cells of the berry tissue of a fresh or partially prefermented pulp without alcoholization or with subsequent fortification to a definite content of alcohol in the given wine, the process is carried out according to the following process diagrams:

(1) Heat treatment of a fresh pulp at a temperature of 60–65° C. for extraction of the coloring matter, cooling of the pulp, separation of the must therefrom, fermentation of the must and its fortification to a definite content of sugar and alcohol in the given wine;

(2) Fermentation of the pulp to a definite content of sugar in the given wine, separation of the must from the pulp and alcoholization of the must;

(3) Fermentation of the pulp to a defiite content of sugar, fortification of the fermented pulp to the necessary content of sugar and alcohol in the given wine, holding of the alcoholized pulp during the period of 45 to 70 days and separation of the wine material from the pulp by means of pressing.

The production of wines according to the first process diagram gives a yield of a high-quality must fraction of about 60 dals. per ton of grapes, while the heat treatment of the pulp adversely affects the wine quality (due to high oxidation of coloring matter and destruction of the aromatics of the berry) and is associated with an increased consumption of heat.

Furthermore, this process is suitable only for production of ordinary wines.

On producing wines according to the second process diagram, the yield of a high-quality must fraction comes to 60 dals. per ton of grapes. In addition, in this case it is not always possible to produce a wine of the given grade due to inadequate extraction of the coloring matter and aromatics from the grapes, as well as to produce wines featured by an adequate palate fullness.

On producing wines according to the third process diagram, the yield of a high-quality wine fraction accounts for about 65 dals. per ton of grapes, the alcoholization of the pulp to a required content of alcohol results in considerable losses of rectified alcohol (up to 15% of the alcohol added into the pulp), the prolonged infusion on the pulp leads to a considerable prolongation of the process and to a considerable increase of the turnover time of the process equipment. Furthermore, the process is labor consuming.

The process of production of white and red strong wines by using a pulp treated with mechanical destruction of the cells of the berry tissue or by using a partially fermented pulp includes the following basic operations: infusion or partial fermentation of the pulp, separation of the must therefrom and fortification of the must to a definite content of sugar and alcohol for the given grade of wine.

According to such a technology, the total yield of the must from one ton of grapes is equal to 74–75 dals., the infusion of the pulp with its subsequent fermentation prolongs the technological process (7 to 10 days) and increases the turnover time of the process equipment. In addition, it is not always possible to make wines having an adequate palate fullness and to provide a sufficiently intensive color of the wines of the red port-wine type due to incomplete extraction of the coloring matter.

The process of production of cognac (in the production of cognac materials) with the use of grape pulp treated with mechanical destruction of the cells of the berry tissues of a fresh pulp includes the following operations: immediate separation of the must from the pulp, cooling of the must and storing it for settling, clarification of the must, decantation of the clarified must and its fermentation.

By using such a process, the yield of high-quality fractions of the must accounts for about 60 dals. per ton of grapes.

The process of making non-alcoholic products (grape juice, vacuum juice, mead, beckmez) with the use of the pulp treated by mechanically destructing the cells of the berry tissues of a fresh pulp, is based on the following operations: separation of the must from the pulp, and storing it for settling, while simultaneously sulfating the must flow, and further treatment of the must depending on the type of the final product: (a) for the juice-clarification of the must, decantation of the clarified must, cooling of the must and stabilization of the juice; (b) for grape concentrates (mead, vacuum juice, beckmez)—deoxidation of the must, clarification and dehydration of the must providing for the sugar content therein brought up to the necessary concentration.

Such a technology provides for the yield of a high-quality fraction of the must about 60 dals. ton of grapes. In this case the grape juice, particularly high-grade juice, features too flat an aroma and inadequate softness in taste.

The basic object of the present invention is to provide a method of treatment of a grape pulp used in the process of production of wines, cognac, and non-alcoholic products by preliminarily treating the pulp, which would make it possible to increase the yield of high-quality must fractions and the total yield of the must per ton of grapes, to reduce the time of the technological process and the turnover period of the process equipment and to considerably improve the quality of the wines, cognac and non-alcoholic products due to development of a fine aroma and formation of a softer and harmonic taste.

This object is attained by providing a method for treating a grape pulp in which the must is separated from the pulp and, according to the invention, added to the pulp is a purified cytolylic ferment or enzyme preparation of a culture of fungus *Trichothecium roseum* in the amount of from 0.0001 to 0.1 percent by weight of the pulp at the activity of the cytolytic enzyme ferment preparation equal to 2500 units. The addition of the enzyme preparation increases the yield of a high-quality fraction of the must from European grapes from 6 to 10 dals. and the total yield of the must from 3 to 7 dals. depending on the grade of grapes, pH of the medium, dose of the preparation and the infusion conditions (temperature, time) while for the hybrid grades, particularly of the Isabella group, the yield increase of high-quality fractions accounts for 10 to 15 dals. and the total increased yield comes to 5 to 10 dals. as well as an increase of the content of sugar in the free run and first pressing must from 0.5 to 3.0% together with an increase of the content of aromatics and compounds providing for a fine taste of the wine.

In the method of production of white table and champagne wine materials, according to the invention, the cytolytic enzyme preparation is added to the pulp in the amount of 0.001 to 0.05 percent by weight, thereafter, the pulp is infused during a period not less than 3 hours at a temperature of 15–20° C., then the must is separated from the pulp and prior to fermentation is treated with bentonite in the amount of not less than 2 g./dal. for inactivating any oxidizing enzymes of the preparation and must. Such a technique provides for an increase in the yield of a high-quality fraction of the must up to 7 dals. depending on the grape grade, pH of the medium, and the infusion conditions (time, temperature) and an increase in the total yield up to 4 dals. per ton of grapes, therefore, these yields account for 65–70 dals. per ton and 70–80 dals per ton respectively.

In addition, the content of sugar in the free run must and in the first pressing must is increased from 0.5 to 2% as well as the content of aromatics in the must, the latter being also enriched with compounds providing a soft taste to the wine. In the process of infusion the yield of the clarified must is increased up to 20% and accounts for about 80% of the quantity of the must set for the infusion. The use of the preparation makes it possible to accelerate the process of clarification of the must and increases its transparence. The wine quality is improved, the wines are featured by a fine and full-bodied aroma and by a soft pleasant taste.

In the method of production of red table wines, according to the invention, the cytolytic enzyme preparation is added into the pulp in the amount of 0.001 to 0.02 percent by weight, which operation is followed by fermentation of the sugar in the pulp. Such a technique makes it possible to increase the yield of a high-quality fraction of the wine materials and the total yield by 3 dals. per ton of grapes and these yields account for 68 dals. and 77 dals. respectively. Furthermore, this method allows the color of the wine to be intensified, particularly when producing wines from poorly colored grapes (Portuguese, etc.), in which case the content of coloring matter is increased by a factor of 2 to 3.

In addition to the above-said advantages, the wines produced by the proposed method have adequate extractivity and fine palate fulness.

In the method of production of white and rose dessert wines, according to the invention, the cytolytic enzyme preparation is added to the pulp in the amount of 0.0001 to 0.1 percent by weight, in which case the pulp is infused within a period from 3 to 24 hours at a temperature of 15 to 40° C. without preliminary alcoholization of the pulp. Such a technique provides for an increase of the yield of a high-quality fraction of the pulp for European grapes within 6 to 10 dals., the total yield within 3 to 7 dals. while for hybrid grape these figures come respectively to 15 and 10 dals. per ton of grapes. The content of sugar in the free run must and in the first pressing must is increased from 2 to 3%. Furthermore, the losses of alcohol during the infusion of the pulp are completely eliminated, the turnover of the process facilities, is accelerated so that the time and labor consumption of the technological process are reduced. The wines produced according to the above described method have a fine oiliness and full-bodied aroma.

In the method of production of red dessert wines, according to the invention, the cytolytic enzyme preparation is added into the pulp in the amount of 0.0001 to 0.005 percent by weight, then the pulp is infused during at least 12 hours at a temperature of 40° C., thereafter the temperature is increased to 60–65° C. and the pulp is held at this temperature for not more than 1 hour, in which case after the cooling and pressing of the pulp, the must is fermented and alcoholized, whereas the pulp is used without preliminary fermentation, alcoholization and subsequent holding of the alcoholized pulp during 45 to 75 days.

Such a technique allows the yield of a high-quality fraction of the must and the total yield to be respectively increased for 10 and 5 dals. per ton of grapes. The content of sugar in the free run must and in the first pressing must is increased from 2 to 3 percent. In addition, the losses of alcohol are eliminated and the time of the technological process is reduced from 45–70 days to 48 hours and this considerably accelerates the turnover of the process equipment and reduces the consumption of labor and energy required for effecting this process. In this case the quality of the wines is noticeably improved while the wines are featured by a thick and intensive color, fine bouquet and adequately full valvety taste.

In the method of production of strong wines, according to the invention, the cytolytic enzyme preparation is added into the pulp in the amount of 0.001 to 0.05 percent by weight, then the pulp is infused during 3 to 24 hours at a temperature of 40° C., in which case, when producing wines of the Madeira and red port-wine type, the pulp is used without its preliminary fermentation. Such a technique provides for an increase of the yield of a high-quality fraction of the must and the total yield respectively for 10 and 5 dals. per ton of grapes. The content of sugar in the free run must and in the first pressing must is increased from 2 to 3%. Furthermore, the duration of the technological process is reduced by 7 to 10 days, the turnover time of the process equipment is also reduced while the wines feature a fine palate fulness.

In the process of production of cognac when making cognac materials, according to the invention, the cytolytic enzyme preparation is added to the pulp in the amount of 0.001 to 0.05 percent by weight, then the pulp is infused during a period not exceeding 6 hours at a temperature of 40° C., thereafter, the pulp is cooled, the must is extracted therefrom and the pulp is fermented.

When using such a process, the yield of a high-quality fraction of the must and the total yield are increased by 10 and 5 dals. per ton of grapes respectviely. The content of sugar in the free run must and in the first pressing must is increased to 2.5%.

In the method of production of non-alcoholic products (grape juice, vacuum juice, mead, beckmez) according to the invention, the cytolytic enzyme preparation is added into the pulp in the amount of 0.001 to 0.1 percent by weight, then the pulp is infused during a period not exceeding 6 hours at a temperature of 15 to 40° C., in which case, when producing grape juice, the pulp prior to clarification is treated with bentonite taken in the amount at least 2 g./dal. for inactivation of the oxidizing enzymes of the preparation and must. On employing such a technique, the yield of a high-quality fraction of the must is increased for the European grades of grapes by 6 to 10 dals., the total yield by 3 to 7 dals. and for the hybrid grades to 15 and 10 dals. per ton of grapes respectively. The content of sugar in the free run must and in the first pressing must is increased up to 2.5%. Furthermore, the produced grape juice is featured by a fine aroma and soft taste.

Other objects and advantages of the invention will be apparent from the following description of a preferred form of embodiment of the invention, reference being made to the accompanying drawings, in which.

The essence of the proposed method of treating the pulp consists in the following.

Added to a pulp produced by crushing the grapes is a purified cytolytic enzyme preparation of a fungus culture "Trichothecium roseum" in the amount of 0.0001 to 0.1 percent by weight of the pulp, the activity of the cytolytic preparation being equal to 2500 units.

After that, the must is separated from the pulp and used for producing a definite sort of wine.

The grape juice is contained within a cell. For extraction of the juice it is necessary to destroy the wall of the cell whose envelopes comprise the following high molecular compounds: cellulose, hemicellulose and pectine.

These compounds provide for strength, elasticity and tightness of the cell. The destruction of the cell is necessary not only for extraction of the juice but also for extraction of compounds determining the quality of a wine, cognac and non-alcoholic products: intensity of coloring, aroma or bouquet and taste. Based upon the chemical composition of the above mentioned compounds, for increasing the yeld of high-quality fractions and the total yield of must per ton of grapes and for more complete utilization of the compounds determining the quality of a wine, cognac and non-alcoholic products, the above-said enzyme preparation is added to the pulp. The cytolytic enzyme preparation is a complex of enzymes comprising cellulose, hemicellulose, cellobiase destroying humin substances. Together with these enzymes, the preparation composition includes accessory enzymes (pectolytic and proteolytic). Under the action of the complex of the enzyme systems of the preparation the polysaccharides of the cell envelopes are subjected to hydrolysis and the penetrability of the cell wall is sharply increased resulting in a maximum extraction of juice and compounds determining the quality of wines.

In addition, due to the hydrolysis of the polysaccharides the content of sugar in the free run must and in the first pressing must is increased while the formation of intermediates products of the destruction of the polysaccharides favorably affects the taste of the wines and juice (particularly softness and oiliness).

The destrictions of the cell structures of grapes, particularly of their skins, provides for a maximum transfer of the coloring matter and aromatics into the must and wine.

The method of production of white table wines, champagne wine materials and grape juice (high-quality juice) by using the pulp treated by the above-described method consists in the following.

Figure 1:
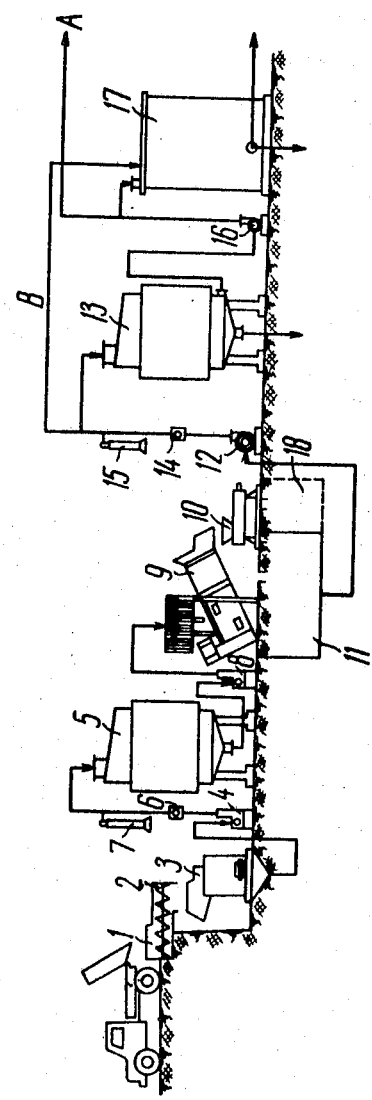
FIG. 1 illustrates a process diagram of production of white table wines, champagne wine materials, white dessert wines and high-quality grape juice.

The grapes from a transport means are unloaded into a receiving bunker 1 (FIG. 1) and therefrom they are fed by a feed screw 2 to a machine 3 for crushing and stemming. The pulp produced after the crushing is forced by a pulp pump 4 into a tank 5 for infusion. Continuously added into the pulp flow by a doser 6 is a working solution of purified cytolytic enzyme preparation of a culture of fungus *Trichothecium roseum* in the amount of 0.001 to 0.05 percent by weight with the activity of 2500 units and added by a sulphodoser 7 is sulfur dioxide for sulfating the pulp taken in the amount of 100 mgm. per liter of the pulp.

The pulp is infused in the tank 5 during a period of not less than 3 hours for white tables wines and not more than 6 hours for grape juice at a temperature of 15–20° C. Then the pulp by means of a pulp pump 8 is fed to a flow feeder, for example a screw feeder, for separation of the free run must and, after that, the pulp is fer into a press 10, for example a screw press, for producing must of the first and second pressings. It is expedient to use low-pressure smooth operating presses, for example pneumatic presses, for pressing the pulp. The produced free run must and the first and second pressings must are fed into a receiving tank 11 and therefrom through a pump 12 are fed into a tank 13 for settling, bentonite being added into the flow of must through a doser 14 in the amount at least 2 g./dal.

Simultaneously with addition of bentonite, by means of a sulphodoser 15, there is added sulfur dioxide in the amount which does not exceed its total content in the must or 100 to 200 mg./l. depending on the must temperature. The infusion is effected during 12 to 15 hours, thereafter, the clarified must is decanted and fed through a pump 16 into a tank 17 for fermentation. The fermentation is effected at a temperature not higher than 28° C. After the fermentation and clarification the young wine is removed from the yeast sediment and is transported for further treatment and holding.

In the process of pressing the pulp there can be produced must of the third fraction which is collected in a tank 18. This fraction is used for making strong wines or for distillation of crude grape alcohol.

The yeast sediment, after removing the wine material, is removed for utilization.

For making high-quality grape juice the infusion of the must is effected without sulfation at a temperature of 10 to 12° C. The clarified must through the pump 16 is fed for cooling and stabilization (the movement of the juice is conventionally shown by an arrow A).

On producing red table wines from grapes having a sufficient content of coloring matter, the process is carried out as described above until the must is fed into the tank 5. In this tank the must is fermented on the pulp at a temperature not exceeding 30° C. After complete fermentation of the sugar the fermented pulp is supplied into the flow feeder 9 and, after that, the process is effected as described above. The produced young wine material of a fine fraction through the pump 12 is fed for further treatment and storage (the movement of the young wine material is conventionally shown by arrow B).

During the production of red wines the maximum amount of the cytolytic enzyme preparation is 0.02 percent by weight of the pulp while transportation of the young wine material is effected without treating this material with bentonite.

When producing white and rose high-quality dessert wines, the process is carried out similarly to the process of production of white table wines until the pulp is fed into the tank 5.

In this tank the pulp is infused without prealcoholization at least 24 hours at a temperature of 15–20° C. After the infusion the pulp through the pulp pump 8 is fed into the flow feeder 9 for separation of the free run must and for further pressing of the pulp in the press 10. The must of a fine fraction through the pump 12 is fed into the tank 13 for fermentation and alcoholization to a required content of sugar and alcohol. Then the produced wine material is transported by the pump 16 into the tank 17 for clarification.

After the clarification, the wine material is removed from the yeast sediment and fed for further holding and treatment. Cytolytic enzyme preparation is added in the amount of 0.005 to 0.015 percent by weight of the pulp. When the must is fed for fermentation, it is used without sulfation and bentonite treatment.

Figure 2:
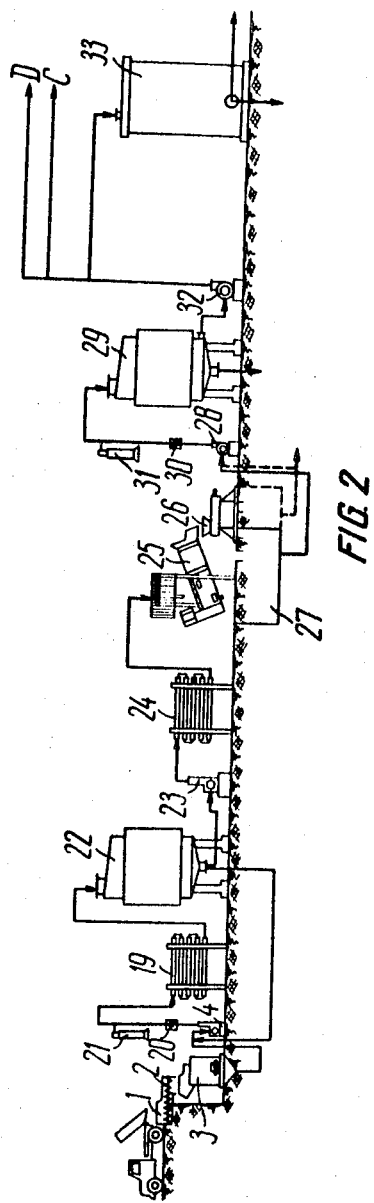
FIG. 2 illustrates a process diagram of production of red table wines, white dessert wines, rose and red dessert wines, strong wines, cognac and ordinary grape juice from poorly colored grapes.

In the process of production of red table wines from poorly colored grapes, the grapes delivered by a transport device are unloaded into the receiving bunker 1, from which by means of the feeder screw 2 it is fed into the machine 3 for crushing and stemming. The pulp produced after the crushing is forced by the pulp pump 4 into the heat exchanger 19 (FIGS. 1, 2) wherein it is heated to 40° C. At the same time, the doser 20 adds into the pulp flow a working solution of purified cytolytic enzyme preparation of a culture of fungus *Trichothecium roseum* in the amount of 0.001 to 0.02 percent by weight of the pulp, the activity of the preparation being equal to 2500 units, while the sulphodoser 21 adds sulfur dioxide in the amount of 100 mg./l. for sulfating the pulp. The heated pulp is fed without prealcoholization from the heat exchanger 19 to a tank 22 for infusion during at least 24 hours at 40° C. (for obtaining the necessary content of coloring matter equal to at least 300 mg./l.). After the infusion the pulp by means of a pulp pump 23 is fed through a cooler 24 into a flow feeder 25 for separating the free run must from the pulp cooled down to 15° C. After that, the pulp is fed to a press 26 for producing must of the first and second pressings. The produced must is fed into a receiving tank 27, therefrom, by means of a pump 28, it is forced into a tank 29 for the infusion, bentonite taken in the amount of at least 2 g./dal. being simultaneously added into the same tank. Simultaneously with the addition of bentonite, a sulphodoser 31 adds sulfur dioxide in the amount which does not exceed its total content in the must of 100 to 200 mg./l. depending on the must temperature. The infusion is effected during 12 to 15 hours, thereafter, the clarified must is decanted and forced by a pump 32 into a tank 33 for fermentation. The fermentation is effected at a temperature not higher than 28° C. After the fermentation and clarification the young wine is removed from the yeast sediment and is transported for further treatment and holding.

In order to intensify the color, the cooled pulp can be directed into the tank 22 for complete fermentation of the sugar followed by separation of the wine material.

When producing white and rose dessert wines, the process is carried out in the same way as the process for production of red wines from poorly colored grapes, except for the fact that when using hybrid grapes (Isabella group), the infusion of the pulp in the tank 22 lasts up to 9 hours while when using European grapes this operation lasts up to 6 hours. In addition, the produced fine fraction must from the tank 27 is directed into the tank 29 without bentonite treatment and sulfation.

The must in the tank 29 is fermented and alcoholized to a required content of sugar and alcohol. Then the produced wine material is forced by the pump 32 from the tank 29 to the tank 33 for clarification. After clarification the wine material is removed from the yeast sediment and is directed for futrher holding and treatment. When producing wines from hybrid grapes, the cytolytic enzyme preparation is added in the amount of 0.02 to 0.1 percent by weight of the pulp, whereas when producing wines from European grapes, the preparation is added in the amount of 0.0001 to 0.01 percent by weight of the pulp.

During the production of red dessert wines the process is run similarly to the process of making red table wines from poorly colored grapes up to the moment of obtaining the free run must and the first and second pressings must. The difference consists in that after the infusion of the pulp in the tank 22 during at least 12 hours at 40° C. (to the moment of extraction of a required quantity of red substances), the temperature is increased up to 60–65° C. by any of the known methods, for example by using a heat exchanger for secondary heating.

After that, the process is carried out in the same way as the process of making white and rose dessert wines. The cytolytic enezyme preparation is added in the amount of 0.0001 to 0.05 percent by weight of the pulp, and the pulp is used without its prefermentation, alcoholization and subsequent holding during 45–70 days.

When making strong wines, the process for production of free run must and pressing fraciton is run similarly to the process of production of red table wines from poorly colored grape except for the wines of the white port-wine grade, which is made by infusing the pulp in the tank 22 during 3–6 hours at 40° C. The further process of production of all strong wines is carried out similarly to the process of making white and rose dessert wines. The cytolytic enzyme preparation is added in the amount of 0.001 to 0.5 percent by weight of the pulp, in which case for the wines of the white port-wine type it is taken in the amount of 0.005 to 0.015 percent by weight. On producing strong wines of the red port-wine and Madeira type, there are used all the pressing fractions of the must and pulp without prefermentation of the pulp.

The process for production of cognac and cognac wine materials is run similarly to the process for production of red wines from poorly colored grapes except for the fact that the infusion of the pulp in the tank 22 is effected during a time period not exceeding 6 hours and the must is not treated with bentonite and is not sulfated during the transportation to the tank 29. The settling in the tank 29 is effected at a temperature of 10–12° C. The cytolytic enzyme preparation is added in the amount of 0.001 to 0.05 percent by weight of the pulp.

The process for production of ordinary grape juice is run similarly to the process for making red wines from poorly colored grapes to the moment of transferring the must from the tank 29 to the tank 33, then the clarified must by means of the pump 32 is directed for cooling and stabilization (the movement of the juice is conventionally shown by an arrow C). When producing the juice from hybrid grapes, particularly of the Isabella group, the cytolytic enzyme preparation is added in the amount 0.02 to 0.1 percent by weight of the pulp, while when producing the juice from European grapes, this preparation is added in the amount of 0.001 to 0.01 percent by weight of the pulp.

Furthermore, depending on the grade of grapes, the infusion of the pulp is effected within a period not exceeding 9 hours for hybrid grapes and 6 hours for European grapes, in which case the settling of the must is effected without sulfation.

The process for production of grape concentrates (vacuum juice, mead, beckmez) is run similarly to the process for making ordinary juice except for the fact that the must acidity is reduced in the tank 29 prior to the beginning of the settling while the clarified must is dehydrated and the content of sugar in the must is brought up to a required concentration (the movement of the must is conventionally shown by an arrow D).

What is claimed is:

1. A method of treating fruit pulp used in the production of wines, cognacs and non-alcoholic beverages, said pulp being obtained by crushing fruit to form a pulp, comprising the steps of adding a clarified cytolytic enzyme preparation of a culture of the fungus *Trichothecium roseum* with a cytolytic activity of at least 2,500 units to the pulp immediately after crushing the fruit, infusing the pulp and separating must from the pulp.

2. A method according to claim 1 wherein the enzyme preparation is added in an amount of 0.0001 to 0.1 percent by weight, the activity of the enzyme preparation being equal to 2500 units.

3. A method for the production of red table wines comprising treating fruit pulp according to claim 2 wherein the enzyme preparation is added in the amount of 0.001 to 0.02 percent by weight, the activity of the enzyme preparation being equal to 2500 units.

4. A method for the production of white table wines and champagne wine materials comprising treating fruit pulp according to claim 2 wherein the enzyme preparation is added in an amount of 0.001 to 0.05 percent by weight, the pulp is infused for at least three hours at a temperature of 15–20° C. and further comprising treating the separated must with bentonite in the amount of at least 2 g./dal. in order to inactivate oxidizing enzymes present in the must.

5. A method for the production of white and rose dessert wines comprising treating fruit pulp according to claim 2 wherein the enzyme preparation is added in an amount of 0.0001 to 0.1 percent by weight and the pulp is infused for a period of 3 to 24 hours at a temperature of 15 to 40° C.

6. A method for the production of red dessert wines comprising treating fruit pulp according to claim 2 wherein the enzyme preparation is added in an amount of 0.0001 to 0.005 percent by weight and the pulp is infused for a period of at least 12 hours at a temperature of 40° C. followed by not more than one hour at 60 to 65° C. further comprising cooling and pressing the pulp and fermenting and alcoholizing the must.

7. A method for the preparation of strong wines comprising treating fruit pulp according to claim 2, wherein the enzyme preparation is added in an amount of 0.001 to 0.05 percent by weight and the pulp is infused for a period of 3 to 24 hours at a temperature of 40° C., further comprising cooling and pressing the pulp and fermenting and alcoholizing the must.

8. A method for the production of cognac comprising treating fruit pulp according to claim 2, wherein the enzyme preparation is added in an amount of 0.001 to 0.05 percent by weight and the pulp is infused for a period not exceeding 6 hours at a temperature of 40° C. further comprising cooling and pressing the pulp and fermenting the must.

9. A method for the production of non-alcoholic beverages comprising treating fruit pulp according to claim 2 wherein the enzyme preparation is added in an amount of 0.001 to 0.1 percent by weight and the pulp is infused for a period not exceeding 6 hours at a temperature of 15 to 40° C.

10. A method for the preparation of non-alcoholic beverages according to claim 9 further comprising treating the must with bentonite in an amount of at least 2 g./dal. in order to inactivate oxidizing enzymes present in the must.

11. A method of treating fruit pulp used in the production of wines, cognacs and non-alcoholic beverages, said pulp being obtained by crushing fruit to form a pulp, separating free run must from the pulp, pressing the pulp, and separating the must from the first pressing leaving a residual pulp, comprising the steps of adding to the residual pulp a clarified cytolytic enzyme preparation of a culture of the fungus *Trichothecium roseum* with a cytolytic activity of at least 2,500 units, infusing the pulp, and separating must therefrom by further pressing.

(References on following page)

References Cited

UNITED STATES PATENTS 3,120,441   2/1964   Asturias _____ 99—35 X

OTHER REFERENCES

Zinchenko et al., Must Preparation for Wine, Chemical Abstracts, vol. 69, July 1968 (p. 1685), QD1A51.

Zinchenko et al., Clarification of Fraction III Must, Chemical Abstracts, vol. 70, June 16, 1969 (p. 214), QD1A51.

Ough et al., Bentonite Treatment of Grape Juice Prior to Wine Fermentation, Chemical Abstracts, vol. 64, 1966 (149226), QD1A51.

Ametine et al., The Technology of Wine Making, 2nd ed., The Avi Publishing Co., Inc., Westport, Conn. 1967 (pp. 312–314), TP548A48.

A. LOUIS MONACELL, Primary Examiner

D. M. NAFF, Assistant Examiner

U.S. Cl. X.R.

99—106